Patented Dec. 16, 1952

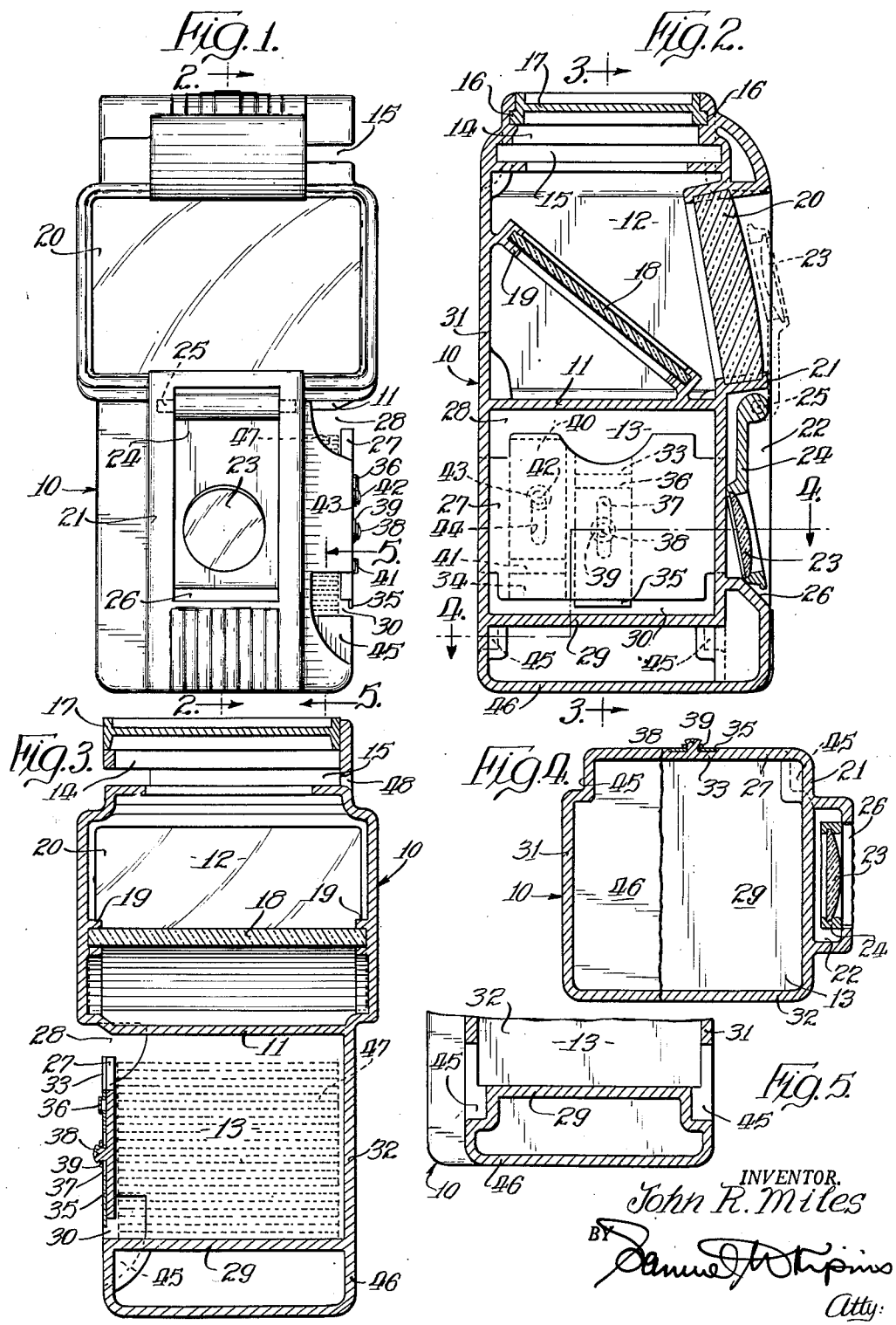

2,621,993

UNITED STATES PATENT OFFICE 2,621,993

SLIDE VIEWER AND DISPENSER

John R. Miles, Chicago, Ill., assignor to Michael S. Wolk, Chicago, Ill.

Application August 25, 1950, Serial No. 181,553

2 Claims. (Cl. 312—42)

My invention relates to improvements in film slide viewers, and more particularly to a novel film slide magazine construction for use with film slide viewers.

It is a principal object of my invention to provide a film slide viewer which is simple to operate and highly efficient, and which includes provisions for storing and dispensing film slides in a predetermined order.

Another important object of my invention is to provide in a film slide viewer, a magazine which not only dispenses slides one at a time regardless of their thickness, but also can be arranged to serve as a storage compartment when the slide viewer is not in use or is being carried about.

Another object of my invention is to provide a compact, inexpensive combination film slide viewer and film slide dispenser.

These and other objects of my invention are achieved by my new film slide viewer, in which the slide dispensing magazine comprises a box-shaped compartment in the lower portion of the viewer, which compartment includes a top, a floor therein on which the slides are stacked, and a gate across one side of the compartment, the gate being spaced below the top to form therewith an upper opening through which slides may be inserted into the compartment, the gate further being spaced above the floor to form therewith a lower opening through which slides may be removed, together with means for closing off the said upper opening and means for varying the effective height of the lower opening both to accommodate slides of different thicknesses and to close off the lower opening, and means to facilitate gripping the lowermost slide, preferably by grasping two corners thereof, to assist in its removal through the lower opening in the compartment.

By placing the slides to be viewed one at a time in the compartment, through the upper opening, it is apparent that the slides can be removed in a predetermined order from the lower opening in the compartment for placement in the film slide viewer for examination and viewing.

In preferred embodiments of my invention, the film slide viewer includes an inclined mirror above the dispenser compartment, a top opening in the viewer directly over the inclined mirror, means for positioning a film slide in the viewer between the top opening and said mirror, and a magnifying lens positioned in the wall in front of the mirror, to magnify the virtual image of the film slide on said mirror. Advantageously, an auxiliary magnifying lens may be hinged to the aforesaid wall of the film slide viewer, for movement to overlie at least a portion of the magnifying lens in said wall, for close examination of the film slides.

In order that my invention may be more fully disclosed, reference is had to the accompanying drawing which illustrates one form of apparatus embodying the foregoing and such other principles, advantages or capabilities as may be pointed out as this description proceeds, or as are inherent in the present invention. For purposes of clarity in exposition, the following description is explicit, and the accompanying drawing is detailed, but it is distinctly to be understood that said exposition is illustrative only, and that my invention is not restricted to the particular details recited in the specification or shown in the drawing.

In the drawing:

Figure 1 is a front view of a preferred embodiment of my new film slide viewer;

Figure 2 is a left side view taken in section on the line 2—2 of Figure 1;

Figure 3 is a rear view taken in section on the line 3—3 of Figure 2;

Figure 4 is a plan view taken in section on the line 4—4 of Figure 2; and

Figure 5 is a fragmentary right side view taken in section on the line 5—5 of Figure 1.

Like reference characters designate like parts in the drawing and in the description of my film slide viewer which follows.

Referring now to the drawing, and more particularly to Figure 2 thereof, my new film slide viewer is shown as comprising a housing 10 which is subdivided by the partition 11 into an upper film slide exhibiting portion 12 and a lower film slide storage and dispenser portion 13. The film viewer portion 12 includes an upper opening 14. Beneath this opening, in the right side of the housing 10 as viewed in Figure 1 there is located a slotted opening 15 adapted to receive and align a film slide beneath the upper opening 14. The upper opening 14 includes a pair of grooves 16, 16 in which the cover 17 (Figures 2 and 3) is slidable. The cover 17 preferably is quite translucent, to allow a substantial portion of the exterior light to impinge upon a film slide inserted in the slotted opening 15. In addition, the cover 17 acts as a dust cover, to prevent the entry of dirt and other foreign objects into the interior of the film viewer portion 12.

A narrow slit 48 is formed in the viewer portion opposite the opening 15 (Figure 3) so that strip film may be threaded through the viewer below the cover 17 for purposes of editing.

A reflecting mirror 18 is held in an inclined position in the film viewer portion 12 by the frame 19. A plano-convex lens 20 is positioned in the front wall 21 in front of the mirror 18, and acts to magnify the virtual image of the film slide on the mirror 18. As shown in Figure 2, the lens 20 is inclined from the vertical approximately 10 degrees, for a purpose to be described presently. The front wall 21 immediately below the lens 20 contains a recess 22, in which an auxiliary magnifying lens 23 and its holder 24 are hingedly mounted on a pin 25. The recess 22 contains a finger groove 26 to facilitate swinging the holder 24 upwardly on the pin 25 to position the lens 23 in the manner shown in dotted outline in Figure 2.

Referring now more particularly to Figures 2 and 3, a gate or wall 27 extends across the right side of the housing 10, as viewed in Figure 1, the gate 27 being spaced below the partition 11 and inwardly of the side of the housing portion 12 to form an upper opening 28 preferably the projecting portion of the partition 11 is inclined inwardly and downwardly for the purpose of guiding the slides into the container. In addition the gate 27 is spaced from the horizontal floor, or false bottom 29 to form a lower opening 30 in the housing. The front wall 21, the rear wall 31 and the side wall 32 opposite the gate 27, are all closed, so that the film storage and dispenser portion 13 is essentially a box-shaped container having an upper opening 28 and a lower opening 30 therein.

The gate 27 is provided with two vertically disposed grooves 33 and 34. A finger tab 35 having a protuberance thereon is slidable in the groove 33. The finger tab 35 further includes a closed slot 37 which is substantially parallel to the groove 33, and through which the stud 38 on the gate 27 projects. A washer 39 is interposed between the stud 38 and the finger tab 35, and is held in place by heading over said stud 38. By means of the protuberance 36, the tab 35 may be shifted up or down along the groove 33, to bridge the lower opening 30 in varying degrees, for a purpose which will be explained presently. Similarly, a finger tab 40 having a protuberance 41 thereon is slidable in the groove 34, and is held in position by the headed over stud 42 and the washer 43 which mates with the closed slot 44. The finger tab 40 can be shifted vertically to abut the bottom surface of the partition 11 and thereby to close off the upper opening 28, much as the finger tab 35 closes off the lower opening 30 in varying degrees. Two finger grooves 45, 45 are formed in the base 46, and are positioned at opposite ends of the lower opening 30, as best shown in Figures 3, 4 and 5.

To use my invention, the operator first selects the slides which are to be viewed and places them one at a time in the storage and dispenser portion 13 through the upper opening 28, in the order in which it is proposed to examine said slides. When this has been done, the slides are arranged in a stack 47 in the lower portion 13, as indicated in dotted outline in Figures 1 and 3. The operator then adjusts the position of the finger tab 35 so that the clearance between the lower end of said tab 35 and the floor 29 is such that only one slide at a time can be removed from the housing 10 through the lower opening 30. The adjustability of the finger tab 35 is especially advantageous, since the slides may be of different thicknesses, depending on the type of slide binding or slide mounting frame which is used. The finger grooves 45, 45 enable the operator to clamp the two outer corners of the lowermost slide between two fingers, and thereby pull said slide through the lower opening 30.

As each slide is removed, it is inserted in the slotted opening 15. Light, which may be either external light or an electric bulb positioned over the translucent cover 17, casts a virtual image of the slide on the mirror 18, which is then viewed through the lens 20. Because of the inclined position of the lens 20, the film slides may be comfortably viewed by holding the viewer in the hand, or placing it on a desk or table before which the observer is seated. Thus it is unnecessary when using my invention to hold the viewer between the source of light and the eye, or to tilt the viewer to observe the film image. By hinging the lens 23 and its holder 24 on the pin 25, additional magnification of the slide may be obtained, to enable the operator to examine details of the slide. After each slide is examined, it can then be placed in a stack or, if desired, reinserted into the lower portion 13 through the opening 28. In either case, the slides are maintained in a predetermined order, for viewing in the desired sequence. Moreover, since only one slide at a time can be removed through the lower opening 30, the operator can automatically withdraw a slide and place it in the slotted opening 15 without even looking at the slide; yet be confident that the slides will be shown in the desired sequence.

Advantageously, the lower portion 13 of the housing 10 serves as a convenient storage compartment for a quantity of slides, and the housing 10 can be carried about, turned upside down or on a side, without the slides dropping out of or becoming disarranged in the lower portion 13. This desirable feature is accomplished by moving the finger tab 35 down until it contacts the floor 29, and moving the finger tab 40 up along its groove 34 until it contacts the partition 11, thereby providing a closure for each of the openings 30 and 28. The washers 39 and 43 provide sufficient binding between the finger tabs 35 and 40 and the gate 27, to securely hold said tabs 35 and 40 in the closed position.

In practice I prefer that my combination film slide viewer and dispensing and storing magazine be molded from one of the many suitable thermo setting plastics. The lenses 20 and 23 and the cover 17 may be made of glass or plastic, while the finger tabs 35 and 40 and washers 39 and 43 may be inexpensively stamped or formed from metal.

Having thus fully disclosed my novel film slide viewer and integral dispensing and storage magazine, and demonstrated its utility by reference to a specific embodiment thereof, I claim as my invention:

1. In a film slide dispenser, a box-shaped cabinet comprising a top, a bottom, side, rear and front walls, a floor in the bottom of the cabinet upon which a stack of superposed film slides is adapted to rest, the front wall being formed with a cross slot adjacent the top of the cabinet, the upper edge of the slot being inclined downwardly and rearwardly to facilitate guiding of the film slides inserted through the slot, said front wall being provided with an additional slot extending thereacross from one side wall to the other side wall and located directly above the floor and through which the slides may be removed, the side walls of the cabinet being formed with curved finger depressions directly subjacent the respective open ends of the additional slot in said front wall to permit grasping of the exposed corner portions of the lowermost slide in the stack in the cabinet by two fingers to facilitate the removal of the lowermost slide through said additional slot.

2. A film slide dispenser of the character recited in claim 1, wherein vertically adjustable gates are mounted on the front wall and are movable across the respective slots.

JOHN R. MILES.

REFERENCES CITED

The following references are of record in the file of this patent:

UNITED STATES PATENTS

| Number | Name | Date |
|---|---|---|
| 34,245 | Duffield | Jan. 28, 1862 |
| 330,182 | Wilcox | Nov. 10, 1885 |
| 888,236 | Hattu | May 19, 1908 |
| 897,728 | Falk | Sept. 1, 1908 |
| 1,634,699 | Upjohn | July 5, 1927 |
| 2,006,100 | Hight et al. | June 25, 1935 |
| 2,211,376 | Isbell | Aug. 13, 1940 |
| 2,436,577 | Kirby | Feb. 24, 1948 |

FOREIGN PATENTS

| Number | Country | Date |
|---|---|---|
| 13,110 | Norway | Feb. 13, 1904 |